(12) United States Patent
Sawabe et al.

(10) Patent No.: US 11,831,560 B2
(45) Date of Patent: Nov. 28, 2023

(54) COMMUNICATION APPARATUS, COMMUNICATION CONTROL SYSTEM, COMMUNICATION CONTROL METHOD, AND NON-TRANSITORY COMPUTER-READABLE MEDIUM STORING PROGRAM FOR AT LEAST DISTRIBUTION OF A PACKET TO A QUEUE AND UPDATE OF A DISTRIBUTION RULE THEREOF

(71) Applicant: NEC Corporation, Tokyo (JP)

(72) Inventors: Anan Sawabe, Tokyo (JP); Takanori Iwai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 33 days.

(21) Appl. No.: 17/427,244

(22) PCT Filed: Jan. 14, 2020

(86) PCT No.: PCT/JP2020/000781
§ 371 (c)(1),
(2) Date: Jul. 30, 2021

(87) PCT Pub. No.: WO2020/162106
PCT Pub. Date: Aug. 13, 2020

(65) Prior Publication Data
US 2022/0103486 A1     Mar. 31, 2022

(30) Foreign Application Priority Data
Feb. 4, 2019     (JP) .................................. 2019-017828

(51) Int. Cl.
*H04L 47/62*     (2022.01)
*H04L 41/082*    (2022.01)
(Continued)

(52) U.S. Cl.
CPC ........ *H04L 47/6215* (2013.01); *H04L 41/082* (2013.01); *H04L 43/0829* (2013.01); *H04L 47/805* (2013.01)

(58) Field of Classification Search
CPC .......................... H04L 47/6215; H04L 47/805
See application file for complete search history.

(56) References Cited

U.S. PATENT DOCUMENTS 6,438,135 B1 *   8/2002   Tzeng ................. H04L 47/2433
                                                370/412
6,967,921 B1 *  11/2005   Levy ...................... H04L 47/29
                                                370/230.1
(Continued)

FOREIGN PATENT DOCUMENTS

JP     2008211759 A     9/2008
JP     2013030890 A     2/2013
(Continued)

OTHER PUBLICATIONS

International Search Report for PCT Application No. PCT/JP2020/000781, dated Mar. 31, 2020.

*Primary Examiner* — Benjamin Lamont
(74) *Attorney, Agent, or Firm* — Sughrue Mion PLLC

(57) ABSTRACT

To perform flexible communication control according to variation in traffic so as to satisfy a plurality of QoS (Quality of Service) indexes. A communication apparatus (1) according to the present invention includes: a distribution unit (12) configured to distribute, based on a distribution rule for satisfying a plurality of different QoS indexes set in a plurality of queues (111 to 11n), respectively, a received packet to any one of the plurality of queues; and an update unit (13) configured to update the distribution rule based on performance information of each of the plurality of queues, (Continued)

the performance information being calculated for the QoS index set in each of the queues.

10 Claims, 12 Drawing Sheets

(51) Int. Cl.
  *H04L 43/0829* (2022.01)
  *H04L 47/80* (2022.01)

(56) References Cited

U.S. PATENT DOCUMENTS

| | | | |
|---|---|---|---|
| 6,990,113 B1* | 1/2006 | Wang | H04L 47/6255 370/429 |
| 2005/0157735 A1* | 7/2005 | Kan | H04L 47/562 370/235 |
| 2009/0010202 A1* | 1/2009 | Masayuki | H04W 72/1242 370/328 |
| 2013/0028080 A1* | 1/2013 | Rao | H04L 47/6215 370/235 |
| 2016/0156425 A1* | 6/2016 | Katayama | H04B 17/102 455/67.13 |
| 2016/0241482 A1* | 8/2016 | Tsuruoka | H04L 69/16 |
| 2017/0272374 A1* | 9/2017 | Cheng | H04L 43/0888 |
| 2018/0324106 A1* | 11/2018 | Billore | H04L 67/10 |

FOREIGN PATENT DOCUMENTS

| | | |
|---|---|---|
| JP | 2015037209 A | 2/2015 |
| JP | 2015207835 A | 11/2015 |
| JP | 2016103669 A | 6/2016 |
| JP | 2016149698 A | 8/2016 |
| JP | 2018037973 A | 3/2018 |

\* cited by examiner

COMMUNICATION APPARATUS, COMMUNICATION CONTROL SYSTEM, COMMUNICATION CONTROL METHOD, AND NON-TRANSITORY COMPUTER-READABLE MEDIUM STORING PROGRAM FOR AT LEAST DISTRIBUTION OF A PACKET TO A QUEUE AND UPDATE OF A DISTRIBUTION RULE THEREOF

This application is a National Stage Entry of PCT/JP2020/000781 filed on Jan. 14, 2020, which claims priority from Japanese Patent Application 2019-017828 filed on Feb. 4, 2019, the contents of all of which are incorporated herein by reference, in their entirety.

TECHNICAL FIELD

The present invention relates to a communication apparatus, a communication control system, a communication control method, and a communication control program, and more particularly to a communication apparatus, a communication control system, communication control method, and a program that performs communication control using a plurality of queues.

BACKGROUND ART

With the spread of IoT (Internet of Things), IoT devices and applications with different requested QoS (Quality of Service) indexes have appeared. Therefore, there is a demand for a technique for adaptively optimizing network parameters according to the requested QoS.

Patent Literature 1 discloses a technique for providing a fair QoS in consideration of transfer delay in a transfer device at a base where user traffics distributed geographically over a wide area are aggregated. Patent Literature 2 discloses a technique for enabling communication with a high security level while reducing a processing load in a case of communication via a plurality of networks having different security levels. Patent Literature 3 discloses a technique for optimizing a beam configuration in a wireless communication network.

CITATION LIST

Patent Literature

Patent Literature 1: Japanese Unexamined Patent Application Publication No. 2018-37973
Patent Literature 2: Japanese Unexamined Patent Application Publication No. 2013-030890
Patent Literature 3: Japanese Unexamined Patent Application Publication No. 2016-103669

SUMMARY OF INVENTION

Technical Problem

However, a problem with the techniques according to Patent Literatures 1 to 3 is that communication control is insufficiently performed to satisfy a plurality of types of QoS indexes according to a plurality of application types when deviation of traffic occurs.

In the technique according to Patent Literature 1, only the delay according to a transmission source area of the traffic is taken into consideration, and a difference in the QoS index for each application type cannot be taken into consideration. In the techniques according to Patent Literatures 2 and 3, different application requests are not taken into consideration.

An object of the present disclosure, which has been made to solve such a problem, is to provide a communication apparatus, a communication control system, a communication control method, and a communication control program capable of performing flexible communication control according to variation in traffic so as to satisfy a plurality of QoS indexes.

Solution to Problem

A communication apparatus according to a first aspect of the present disclosure includes:
a distribution unit configured to distribute, based on a distribution rule for satisfying a plurality of different QoS (Quality of Service) indexes set in a plurality of queues, respectively, a received packet to any one of the plurality of queues; and
an update unit configured to update the distribution rule based on performance information of each of the plurality of queues, the performance information being calculated for the QoS index set in each of the queues.

A communication control system according to a second aspect of the present disclosure includes:
a communication apparatus including a plurality of queues in which a plurality of different QoS (Quality of Service) indexes are set; and
an information processing apparatus connected to the communication apparatus,
the communication apparatus being configured to distribute, based on a distribution rule for satisfying the plurality of QoS indexes, a received packet to any one of the plurality of queues, and to transmit performance information of each of the plurality of queues to the information processing apparatus, the performance information being calculated for the QoS index set in each of the plurality of queues,
the information processing apparatus being configured to update the distribution rule based on the performance information received from the communication apparatus, and to set the updated distribution rule in the communication apparatus.

A communication control method according to a third aspect of the present disclosure includes:
distributing, based on a distribution rule for satisfying a plurality of different QoS (Quality of Service) indexes set in a plurality of queues, respectively, a received packet to any one of the plurality of queues; and
updating the distribution rule based on performance information of each of the plurality of queues, the performance information being calculated for the QoS index set in each of the queues.

A communication control program according to a fourth aspect of the present disclosure causes a computer to execute:
a process of distributing, based on a distribution rule for satisfying a plurality of different QoS (Quality of Service) indexes set in a plurality of queues, respectively, a received packet to any one of the plurality of queues; and
a process of updating the distribution rule based on performance information of each of the plurality of queues, the performance information being calculated for the QoS index set in each of the queues.

Advantageous Effect of Invention

According to the present disclosure, it is possible to provide a communication apparatus, a communication control system, a communication control method, and a communication control program capable of performing flexible communication control according to variation in traffic so as to satisfy a plurality of QoS indexes.

DESCRIPTION OF EMBODIMENTS

Figure 1:
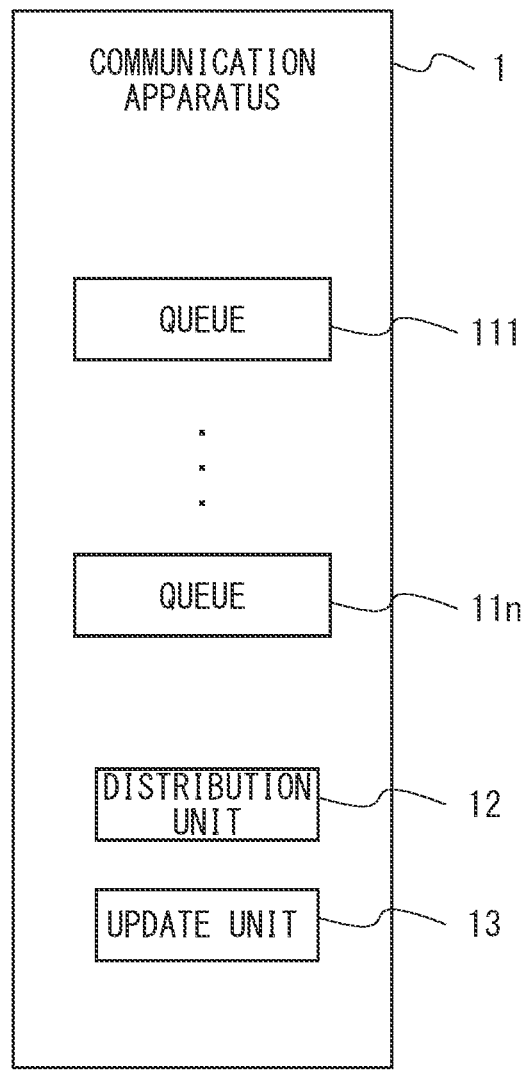
FIG. 1 is a block diagram showing a configuration of a communication apparatus according to a first example embodiment.

Example embodiments of the present disclosure will be described below with reference to the drawings. In each of the drawings, the same or equivalent elements are denoted by the same reference numerals, and will not be repeatedly described as necessary for the sake of clarity of description.

First Example Embodiment

FIG. 1 is a block diagram showing a configuration of a communication apparatus 1 according to a first example embodiment. The communication apparatus 1 receives data transmitted from one or more communication apparatuses via a communication line, and transmits the data to a destination of the received data via the communication line. The communication apparatus 1 can also be referred to as an information processing apparatus that performs communication control for relaying data. The communication apparatus 1 includes queues 111 to 11$n$ (n being an integer of 2 or more), a distribution unit 12, and an update unit 13.

Each of the queues 111 to 11$n$ is a storage region in which an input communication packet is temporarily retained to output the communication packet using a FIFO (First In First Out) system. Further, the queues 111 to 11$n$ are set with a plurality of different QoS (Quality of Service) indexes, respectively. Then, each of the queues 111 to 11$n$ performs control (QoS control) according to the set QoS index. Since a known technique can be used as a technique for realizing the QoS control, and a detailed description thereof will not be provided. Here, the QoS index includes a type and a request value. Examples of the types of QoS indexes include a throughput, a queuing delay, a jitter of queuing delay, and a loss rate, and further include a combination of two or more of these types. The request value of the QoS index is a performance value required for the type of QoS index. Therefore, for example, the QoS index is that a guaranteed band is 10 Mbps. In addition, different QoS indexes include a QoS index having a different type and a QoS index having the same type but being different in a request value.

The distribution unit 12 distributes the received packet to any one of the queues 111 to 11$n$ based on a distribution rule. Here, the received packet is data received by the communication apparatus 1 from an external communication apparatus via a communication line. Then, the distribution rule is a rule for satisfying the plurality of different QoS indexes which are set in the queues 111 to 11$n$, respectively. For example, the distribution rule is information defined to distribute the received packet to the queue corresponding to the request QoS index specified by an application type designated in a header of the received packet and the like.

The update unit 13 updates the distribution rule based on performance information on each of the queues 111 to 11$n$. Here, the performance information is information calculated for the QoS index set in each of the queues.

Figure 2:
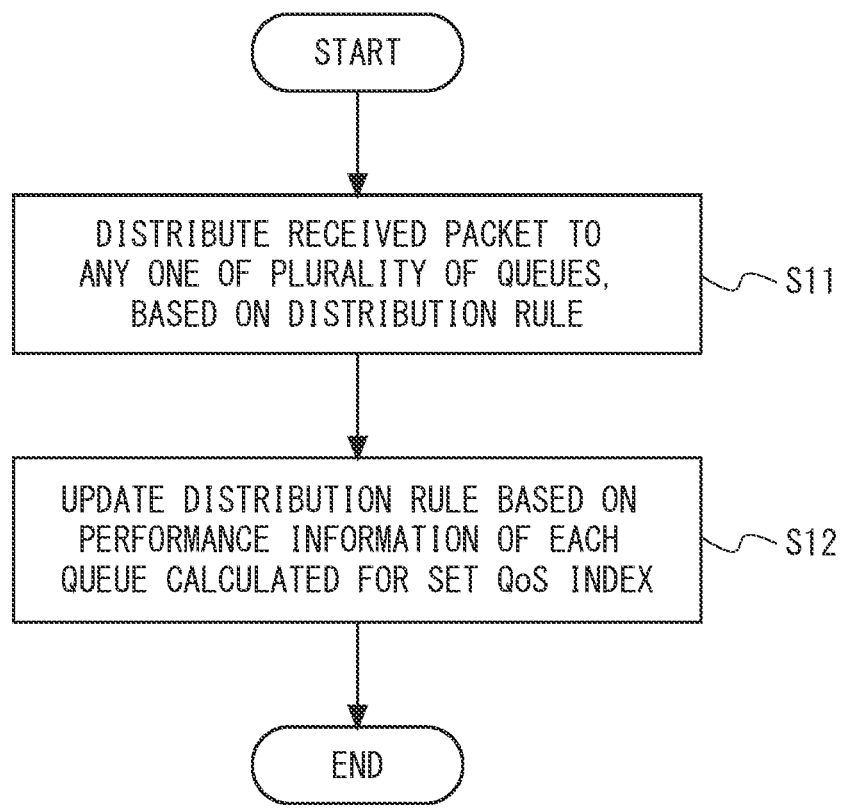
FIG. 2 is a flowchart showing a flow of a communication control method according to the first example embodiment.

FIG. 2 is a flowchart showing a flow of a communication control method according to the first example embodiment. First, the distribution unit 12 distributes, based on the distribution rule, the received packet to any one of the plurality of queues (S11). Next, the update unit 13 updates the distribution rule based on the performance information on each of the plurality of queues calculated for the QoS indexes which are set in the queues, respectively (S12).

As described above, data transmission by various applications increases from various IoT devices, and the communication apparatus for relaying such data is required. In this case, the request of the QoS index differs depending on the application type. In the communication apparatus, therefore, it is preferable to set the plurality of different QoS indexes in the plurality of queues in advance, and to distribute the received packet to the queue set with the QoS index corresponding the request QoS index in the received packet. Therefore, it is effective to define and use the distribution rule so as to satisfy the QoS index of each of the queues.

However, deviation of traffic can occur due to the reception of the transmission data from various applications. Therefore, it may be difficult to satisfy the QoS index of each queue with the initially set distribution rule. Moreover, there is a limit to predict the deviation of traffic in advance.

Accordingly, the first example embodiment uses performance information calculated (measured) when the received packet distributed to each queue by the distribution unit 12 according to the distribution rule is output (transmitted to the outside) according to the QoS control based on the QoS index set in each queue. In other words, the update unit 13 dynamically updates the distribution rule based on the performance information calculated for the QoS index. Therefore, the distribution unit 12 can perform distribution each time using the updated distribution rule in which the measured value of the actual QoS index is fed back. Accordingly, even when the deviation of traffic occurs, communication control can be performed to satisfy a plurality of types of QoS indexes according to a plurality of application types, and flexible communication control according to variation in traffic can be performed to satisfy the plurality of QoS indexes.

The communication apparatus 1 includes a processor, a memory, and a storage apparatus, which are not shown. In addition, the storage apparatus stores a computer program in which the processes of the communication control method according to the present example embodiment are implemented. Then, the processor reads the computer program from the storage apparatus into the memory and executes the computer program. Thus, the processor realizes functions of the distribution unit 12 and the update unit 13.

Alternatively, each of the distribution unit 12 and the update unit 13 may be realized by dedicated hardware. Further, some or all of the components in each apparatus may be realized by a general-purpose or dedicated circuitry, a processor, or a combination thereof. These components may be formed from a single chip or may be formed from a plurality of chips connected to each other via a bus. Some or all of the components in each apparatus may be realized by a combination of the above-described circuitry and a program. As a processor, a CPU (Central Processing Unit), a GPU (Graphics Processing Unit), or an FPGA (Field Programmable Gate Array) can be used.

Second Example Embodiment

Figure 3:
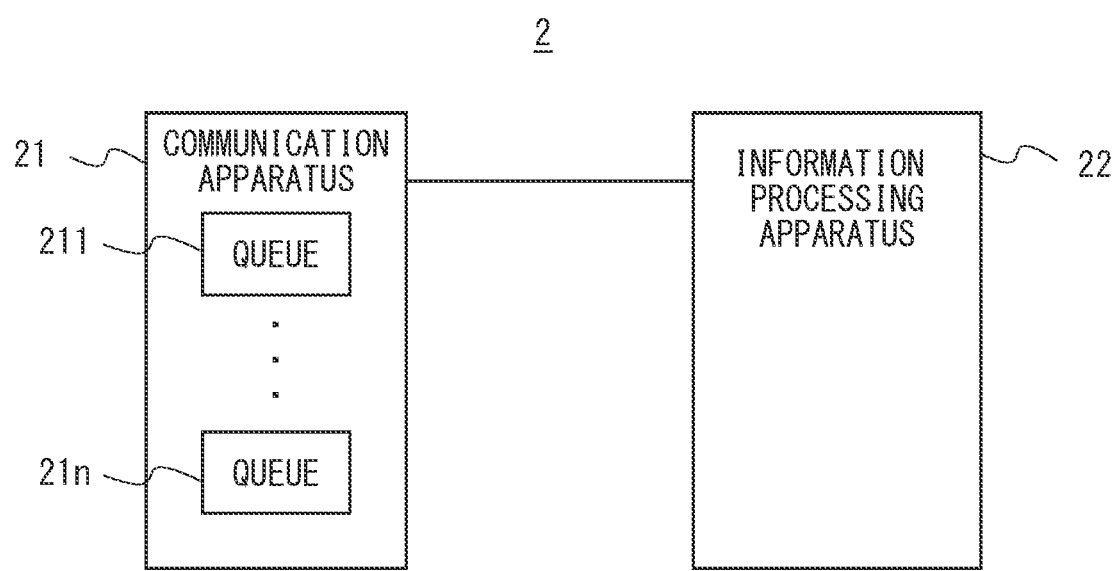
FIG. 3 is a block diagram showing an overall configuration of a communication control system according to a second example embodiment.

FIG. 3 is a block diagram showing an overall configuration of a communication control system 2 according to a second example embodiment. The communication control system 2 includes a communication apparatus 21 and an information processing apparatus 22. The communication apparatus 21 and the information processing apparatus 22 are communicably connected to each other. In addition, the communication apparatus 21 receives data, which is transmitted from one or more communication apparatuses, via a communication line, and transmits the data to a destination of the received data via the communication line.

The communication apparatus 21 includes at least queues 211 to 21n. The queues 211 to 21n are similar to the queues 111 to 11n described above, and are set with a plurality of different QoS indexes.

The communication apparatus 21 distributes, based on a distribution rule for satisfying the plurality of QoS indexes, a received packet to any one of the plurality of queues. Then, the communication apparatus 21 transmits performance information of each of the plurality of queues to the information processing apparatus 22, the performance information being calculated for the QoS index set in each of the plurality of queues.

It is assumed that the information processing apparatus 22 retains a distribution rule in advance as in the communication apparatus 21. The information processing apparatus 22 updates the distribution rule based on the performance information received from the communication apparatus 21. Then, the information processing apparatus 22 sets the updated distribution rule in the communication apparatus 21.

Figure 4:
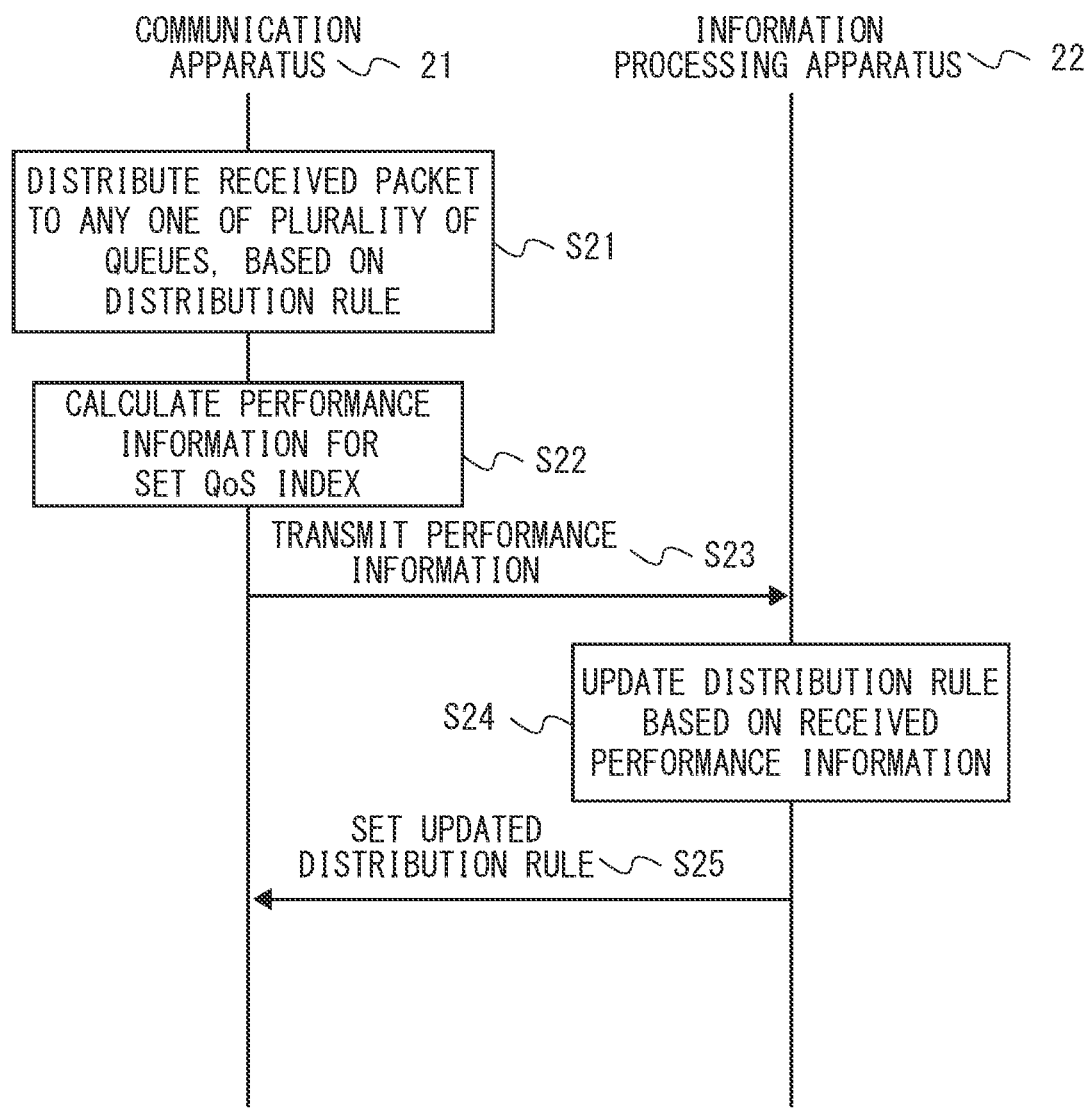
FIG. 4 is a sequence diagram showing a flow of a communication control method according to the second example embodiment.

FIG. 4 is a sequence diagram showing a flow of a communication control method according to the second example embodiment. First, the communication apparatus 21 distributes, based on the distribution rule, the received packet to any one of the plurality of queues (S21). Next, the communication apparatus 21 calculates performance information of each of the plurality of queues for the set QoS index (S22). Then, the communication apparatus 21 transmits the calculated performance information to the information processing apparatus 22 (S23).

Subsequently, the information processing apparatus 22 updates the distribution rule based on the performance information received from the communication apparatus 21 (S24). Then, the information processing apparatus 22 transmits the updated distribution rule to set it in the communication apparatus 21 (S25).

As described above, similarly to the first example embodiment described above, even in the second example embodiment, even when the deviation of traffic occurs, flexible communication control according to variation in traffic can be performed to satisfy the plurality of QoS indexes.

The communication apparatus 21 includes a processor, a memory, and a storage apparatus, which are not shown. In addition, the storage apparatus stores a computer program in which the processes of the communication control method (for example, steps S21, S22, and S23) in the communication apparatus 21 according to the present example embodiment are implemented. Then, the processor reads the computer program from the storage apparatus into the memory and executes the computer program. Thus, the processor realizes a function of the communication apparatus 21.

Alternatively, the communication apparatus 21 may be realized by dedicated hardware. Further, some or all of the components in each apparatus may be realized by a general-purpose or dedicated circuitry, a processor, or a combination thereof. These components may be formed from a single chip or may be formed from a plurality of chips connected to each other via a bus. Some or all of the components in each apparatus may be realized by a combination of the above-described circuitry and a program. As a processor, a CPU (Central Processing Unit), a GPU (Graphics Processing Unit), or an FPGA (Field Programmable Gate Array) can be used.

Further, the information processing apparatus 22 includes a processor, a memory, and a storage apparatus, which are not shown. In addition, the storage apparatus stores a computer program in which the processes of the communication control method (for example, steps S24 and S25) in the information processing apparatus 22 according to the present example embodiment are implemented. Then, the processor reads the computer program from the storage apparatus into the memory and executes the computer program. Thus, the processor realizes a function of the information processing apparatus 22.

Alternatively, the information processing apparatus 22 may be realized by dedicated hardware. Further, some or all of the components in each apparatus may be realized by a general-purpose or dedicated circuitry, a processor, or a combination thereof. These components may be formed from a single chip or may be formed from a plurality of chips connected to each other via a bus. Some or all of the components in each apparatus may be realized by a combination of the above-described circuitry and a program. As a processor, a CPU (Central Processing Unit), a GPU (Graphics Processing Unit), or an FPGA (Field Programmable Gate Array) can be used.

In addition, when some or all of the components in the information processing apparatus 22 is realized by a plurality of information processing apparatuses and circuits, the plurality of information processing apparatuses and circuits may be concentrated or distributed in arrangement. For example, the information processing apparatuses and circuits may be realized in a state of being connected to each other via a communication network such as a client-server system or a cloud computing system. Further, the function of the information processing apparatus 22 may be provided in a SaaS (Software as a Service) format.

Third Example Embodiment

The problem to be solved by the present example embodiment will be described in detail. As described above, since the types of applications (application types) for performing communication increase due to the spread of the IoT devices, the following problems are caused. First, various application types of traffic are mixed in a gateway close to the edge, and thus it is required to satisfy a plurality of QoS indexes by a throughput increase, a delay reduction, and a jitter reduction. Therefore, a request QoS index increases. Further, the speed of a radio section increases, and a traffic flowing into an IoT gateway (IoT-GW) accommodating a plurality of access points increases. Therefore, the IoT-GW can be a bottleneck.

In addition, a CBQ (Class based queueing) has become widespread as a queuing technique using a plurality of queues provided in the communication apparatus. The CBQ is a technique for providing a buffer for each class in order to process inflow traffics having different requested QoS indexes so as to satisfy each QoS index. However, the CBQ has problems that when deviation of the inflow traffic occurs, the QoS performance deteriorates in the class where the traffic is concentrated, and classification becomes meaningless.

Therefore, the third example embodiment is a specific example of the first example embodiment described above, and is to solve at least a part of the above-described problems. In the third example embodiment, even when the inflow traffics having different request QoS indexes deviate and the inflow traffics are concentrated in a certain traffic class, the QoS can be maximized by packet distribution suitable for the inflow traffics. Therefore, for example, packets are distributed according to a predetermined distribution rule for inflow traffic to a plurality of queues in which different QoS evaluation equations are set, and the evaluation equation of the QoS and the predetermined distribution rule are updated such that the QoS evaluation values of all of the queues are maximized. Thereby, even when the inflow traffics are concentrated in a certain traffic class, the overall QoS of a plurality of queues can be improved.

Figure 5:
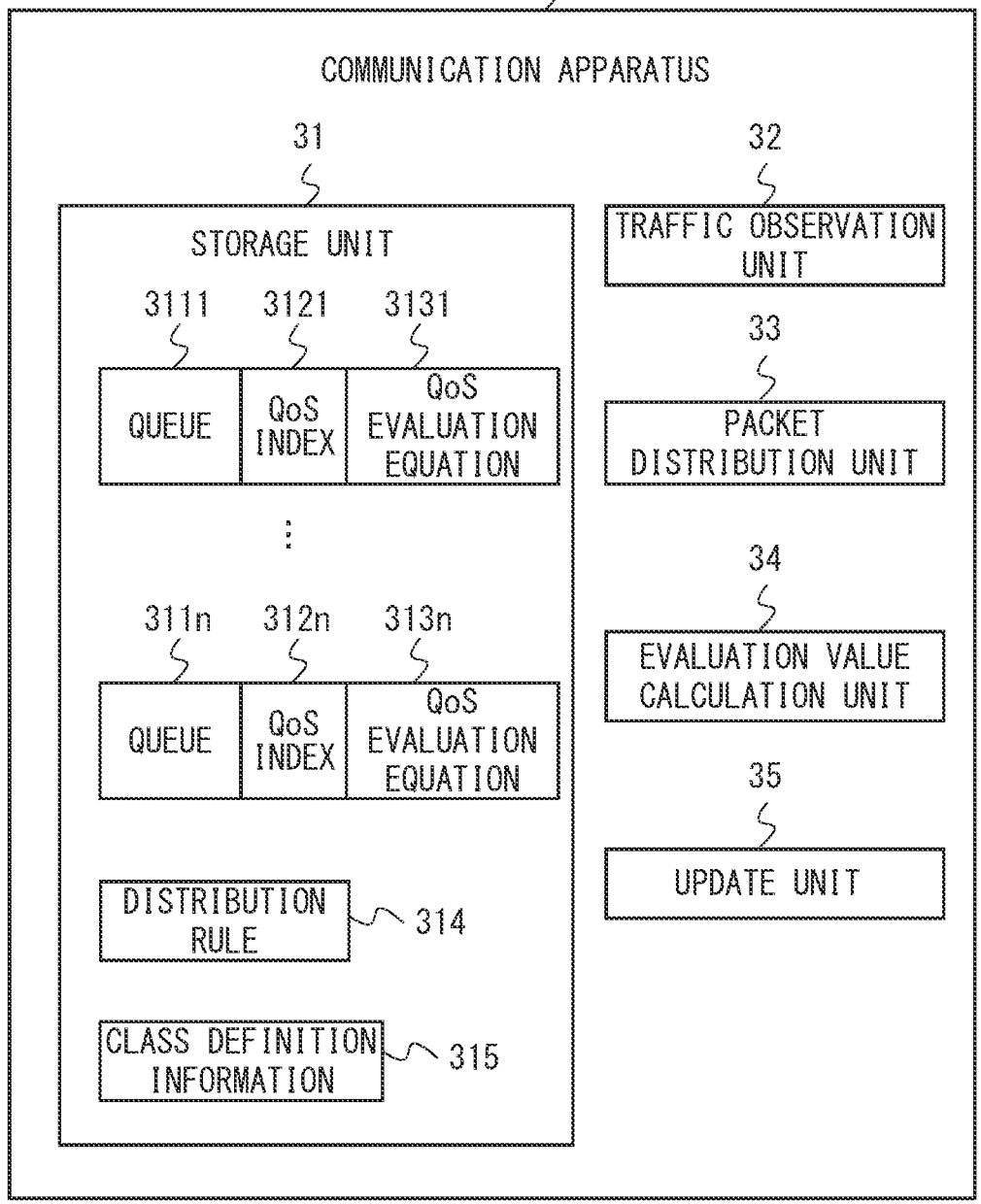
FIG. 5 is a block diagram showing a configuration of a communication apparatus according to a third example embodiment.

FIG. 5 is a block diagram showing a configuration of a communication apparatus 3 according to the third example embodiment. The communication apparatus 3 is a specific example of the communication apparatus 1 described above. The communication apparatus 3 includes a storage unit 31, a traffic observation unit 32, a packet distribution unit 33, an evaluation value calculation unit 34, and an update unit 35.

The storage unit 31 stores a set of a queue 3111, a QoS index 3121, and a QoS evaluation equation 3131, ( . . . ), a set of a queue 311n, a QoS index 312n, and a QoS evaluation equation 313n, a distribution rule 314, and class definition information 315. The queues 3111 to 311n are similar to the queues 111 to 11n described above, and are set with different QoS indexes and QoS evaluation equations, respectively. In other words, the queue 3111 is set with the QoS index 3121 and the QoS evaluation equation 3131. Similarly, the queue 311n is set with the QoS index 312n and the QoS evaluation equation 313n.

Each of the QoS indexes 3121 to 312n is the QoS index described in the first example embodiment, and types of the QoS indexes include, for example, a throughput (τ), a queuing delay (D), a jitter (J) of queuing delay, and a loss rate (L).

Each of the QoS evaluation equations 3131 to 313n is a calculation equation for calculating a QoS evaluation value in the corresponding queue according to the QoS index set in the corresponding queue. Here, the QoS evaluation value is an example of the performance information described above. Then, the QoS evaluation equation is a calculation equation for calculating a degree of improvement from performance information of an immediately preceding section in the corresponding queue, as the QoS evaluation value.

The QoS evaluation equation can be defined as Equation (1) to be described below, for example. However, the QoS evaluation equation is not limited to Equation (1).

[Equation 1]

$$r_t^i = \alpha_{Throughput} * \frac{\tau_t}{\tau_{t-1}} + \alpha_{Delay} * \left(1 - \frac{D_t}{D_{t-1}}\right) + \alpha_{Jitter} * \left(1 - \frac{J_t}{J_{t-1}}\right) + \alpha_{Loss} * \left(1 - \frac{L_t}{L_{t-1}}\right) \quad (1)$$

Here, the symbol r represents a QoS evaluation value, the symbol τ represents a throughput, the symbol D represents a queuing delay, the symbol J represents a jitter of the queuing delay, and the symbol L represents a loss rate. Then, the symbol i represents a class number (identification number of a queue), and the symbol t represents a time. Therefore, the symbol $r_t^i$ represents a QoS evaluation value at the class number (identification number of the queue) i and the time t. Further, the symbols $\tau_t$, $D_t$, $J_t$, and $L_t$ represent a throughput, a queuing delay, a jitter of the queuing delay, and a loss rate at the time t, respectively, and the symbols $\tau_{t-1}$, $D_{t-1}$, $J_{t-1}$, and $L_{t-1}$ represent a throughput, a queuing delay, a jitter of the queuing delay, and a loss rate at a time t−1, which is an immediately preceding section of the time t, respectively. Then, each of the symbols $\alpha_{Throughput}$, $\alpha_{Delay}$, $\alpha_{Jitter}$, and $\alpha_{Loss}$ represents weighting of a degree of improvement from the performance information (throughput and the like) of the immediately preceding section in the corresponding queue. Note that the value r may be normalized to a section [0, 1].

The distribution rule 314 is the distribution rule described in the first example embodiment, and is information indicating a ratio of the received packets to be distributed to each queue. For example, the distribution rule 314 is information that information obtained in correlation with the class number i for identifying the queue and the ratio of the amount of the received packets that should be distributed to the corresponding queue in all the received packets for a predetermined period is defined in each of the queues 3111 to 311n.

The class definition information 315 is a table in which a correlation between the application type and the class is defined. The application type indicates information extracted from a specific region of the header of the received packet, for example. In addition, the class indicates a QoS index, that is a request QoS index that should be emphasized in the correlated application type. Then, it is assumed that the request QoS index indicated by the class is set in one queue of the queues 3111 to 311n.

The traffic observation unit 32 observes a traffic of the data (packet) received from the outside by the communication apparatus 3, and acquires it as a received packet.

The packet distribution unit 33 is a specific example of the distribution unit 12 described above. The packet distribution unit 33 specifies a queue corresponding to the QoS index, which is designated in the received packet, from the queues 3111 to 311n. Then, when the ratio of the amount of the received packets in the specified queue for a predetermined period exceeds the ratio of the received packets in the specified queue shown in the distribution rule 314, the packet distribution unit 33 distributes the received packet to the queue other than the specified queue.

The evaluation value calculation unit 34 calculates a QoS evaluation value as performance information in each of the queues using the QoS evaluation equation set in each of the queue. For example, the evaluation value calculation unit 34 calculates the QoS evaluation value $r^i_t$ using Equation (1) described above. Further, the evaluation value calculation unit 34 calculates a total evaluation value of all of the queues based on the plurality of QoS evaluation values, which are calculated for the plurality of queues, respectively. For example, the evaluation value calculation unit 34 calculates, using Equation (2) to be described below, a total evaluation value (sum of the QoS evaluation values of the respective queues) $R_t$.

[Equation 2]

$$R_t = \Sigma_i r^i_t \quad (2)$$

The update unit 35 is a specific example of the update unit 13 described above, and updates the distribution rule 314 to maximize the total evaluation value. Here, the update unit 35 learns a classification of classes of inflow traffics to maximize the sum of the QoS evaluation values of the respective queues, and thus aims to maximize the QoS by the distribution suitable for the inflow traffic even when the traffic deviates to a certain class. The update unit 35 performs reinforcement learning, so to speak. Here, the update unit 35 can obtain the sum $\Lambda$ of inflow traffics using Equation (3) to be described below, for example.

[Equation 3]

$$\Lambda = \Sigma_i \lambda_i \quad (3)$$

Here, $\lambda_i$ represents a traffic in which the application type indicated by the class i is designated in the header of the received packet, that is, the amount of data in the received packet.

In addition, a ratio of traffic (distribution rule) to be input to each of the queues is defined as $\lambda'_i$. In this case, when the ratio of traffic $\lambda'_i$ changes, the total evaluation value $R_t$ also changes. Therefore, the update unit 35 obtains the distribution rule $\lambda'_i$ using Equation (4) to be described below, for example, so as to maximize the total evaluation value $R_t$.

[Equation 4]

$$\lambda' = \arg_{\lambda'} \max R_t^Q(\lambda_i) \quad (4)$$

Further, the update unit 35 defines an error with Equations (5) and (6) to be described below in order to transform the equation from "maximization of reward" to "minimization of error", and may obtain the distribution rule using an algorithm such as a stochastic gradient descent.

[Equation 5]

$$L = \frac{1}{2}(\Sigma_i \max(r^i) - R_t^Q(\lambda'_i))^2 \quad (5)$$

[Equation 6]

$$\nabla L = (\Sigma_i \max(r^i) - R_t^Q(\lambda'_i)) \nabla \lambda'_i \quad (6)$$

Here, the symbol L represents an error (Loss).

Then, when the distribution rule is updated as described above, the packet distribution in the updated packet distribution unit 33 causes packets of a class, which cannot flow in without a distribution function, to flow into the queue. Therefore, the evaluation equation is updated according to the distribution result, and thus the degree of improvement in QoS is appropriately evaluated even when packets having different request QoS flow in.

Therefore, the update unit 35 according to the third example embodiment further updates the QoS evaluation equations 3131 to 313n based on the performance information. At this time, the update unit 35 may update the QoS evaluation equations 3131 to 313n by reflecting the ratio of the QoS index designated in the received packet received in a predetermined period on weighting of the degree of improvement. For example, it is assumed that out of all the received packets received in the predetermined period, the ratio of the received packets designated with the QoS index emphasizing the throughput is 20%, and the ratio of the received packets designated with the QoS index emphasizing the delay is 80%. In this case, the update unit 35 sets (updates) a parameter (weighting) of the QoS evaluation equation indicated in Equation (1) described above as $\alpha_{Throughput} = 0.2$ and $\alpha_{Delay} = 0.8$.

Figure 6:
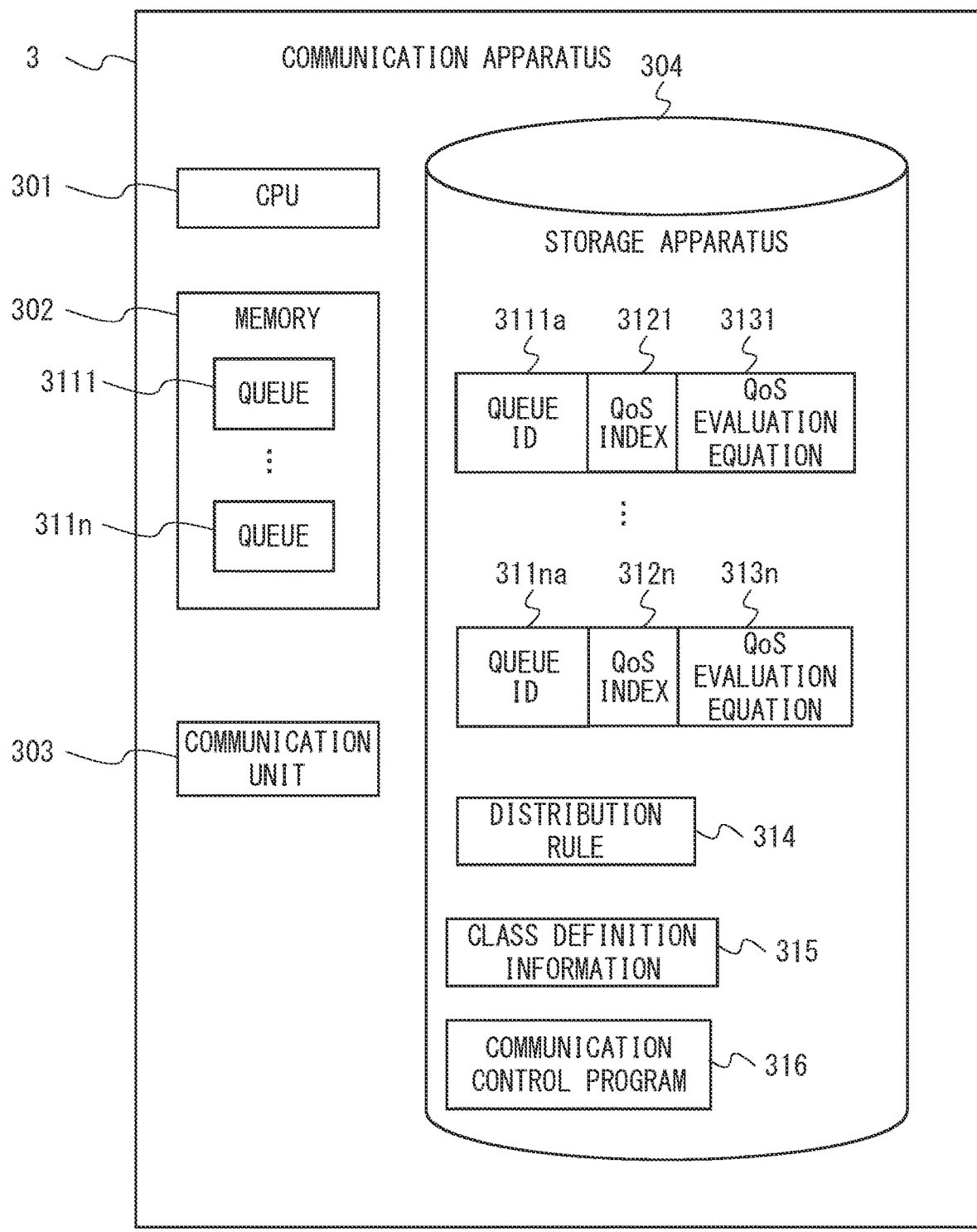
FIG. 6 is a block diagram showing a hardware configuration of the communication apparatus according to the third example embodiment.

FIG. 6 is a block diagram showing a hardware configuration of the communication apparatus 3 according to the third example embodiment. FIG. 6 shows the above-described communication apparatus 3 from the viewpoint of hardware. The communication apparatus 3 includes at least a CPU 301, a memory 302, a communication unit 303, and a storage apparatus 304. The storage apparatus 304 is a storage apparatus such as a hard disk or a flash memory corresponding to a non-volatile storage device in the storage unit 31 described above. It is assumed that the storage apparatus 304 stores queue IDs 3111a to 311na, which are identification information of the queues 3111 to 311n, and a communication control program 316, which is not shown in FIG. 5, in addition to the QoS indexes 3121 to 312n, the QoS evaluation equations 3131 to 313n, the distribution rule 314, and the class definition information 315 which are shown in FIG. 5. Here, the queue ID 3111a, the QoS index 3121, and the QoS evaluation equation 3131 are correlated with each other. Similarly, the queue ID 311na, the QoS index 312n, and the QoS evaluation equation 313n are correlated with each other. The communication control program 316 is a computer program in which the processes of the communication control method according to the present example embodiment is implemented.

The memory 302 is a volatile storage device such as a RAM (Random Access Memory), and is a storage region in which information is temporarily retained during the operation of the CPU 301. Further, the memory 302 secures regions of the queues 3111 to 311n. However, the queues 3111 to 311n may be realized by a storage region other than the memory 302.

The communication unit 303 is an interface that performs input and output of the communication apparatus 3 with the outside. In particular, the communication unit 303 transmits and receives packets to and from an external communication apparatus via a communication line.

The CPU 301 is a processor, that is, a control apparatus that controls each component of the communication apparatus 3. The CPU 301 reads the communication control program 316 from the storage apparatus 304 into the memory 302, and executes the communication control program 316. Thereby, the CPU 301 realizes functions of the traffic observation unit 32, the packet distribution unit 33, the evaluation value calculation unit 34, and the update unit 35.

Figure 7:
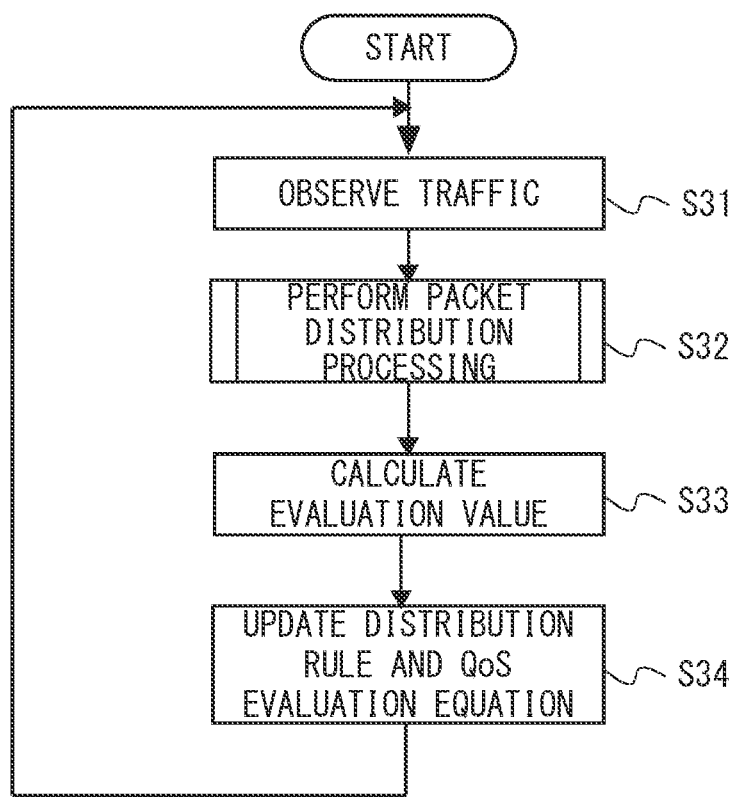
FIG. 7 is a flowchart showing a flow of a communication control method according to the third example embodiment.

FIG. 7 is a flowchart showing a flow of the communication control method according to the third example embodiment. First, the traffic observation unit 32 observes the traffic of the data received by the communication apparatus 3, and acquires it as a received packet (S31). Next, the packet distribution unit 33 performs packet distribution processing to be described below (S32). Then, the evaluation value calculation unit 34 calculates an evaluation value (S33). Specifically, the evaluation value calculation unit 34 calculates, based on the packets sent from the queue in a predetermined period, a QoS evaluation value for each queue using the QoS evaluation equation set in the queue. Then, the evaluation value calculation unit 34 calculates a total evaluation value from the QoS evaluation values of the respective queues.

Subsequently, the update unit 35 updates the distribution rule 314 so as to maximize the total evaluation value calculated in step S33, and also updates the QoS evaluation equation set in each of the queue as described above (S34). Then, the process returns to step S31.

Figure 8:
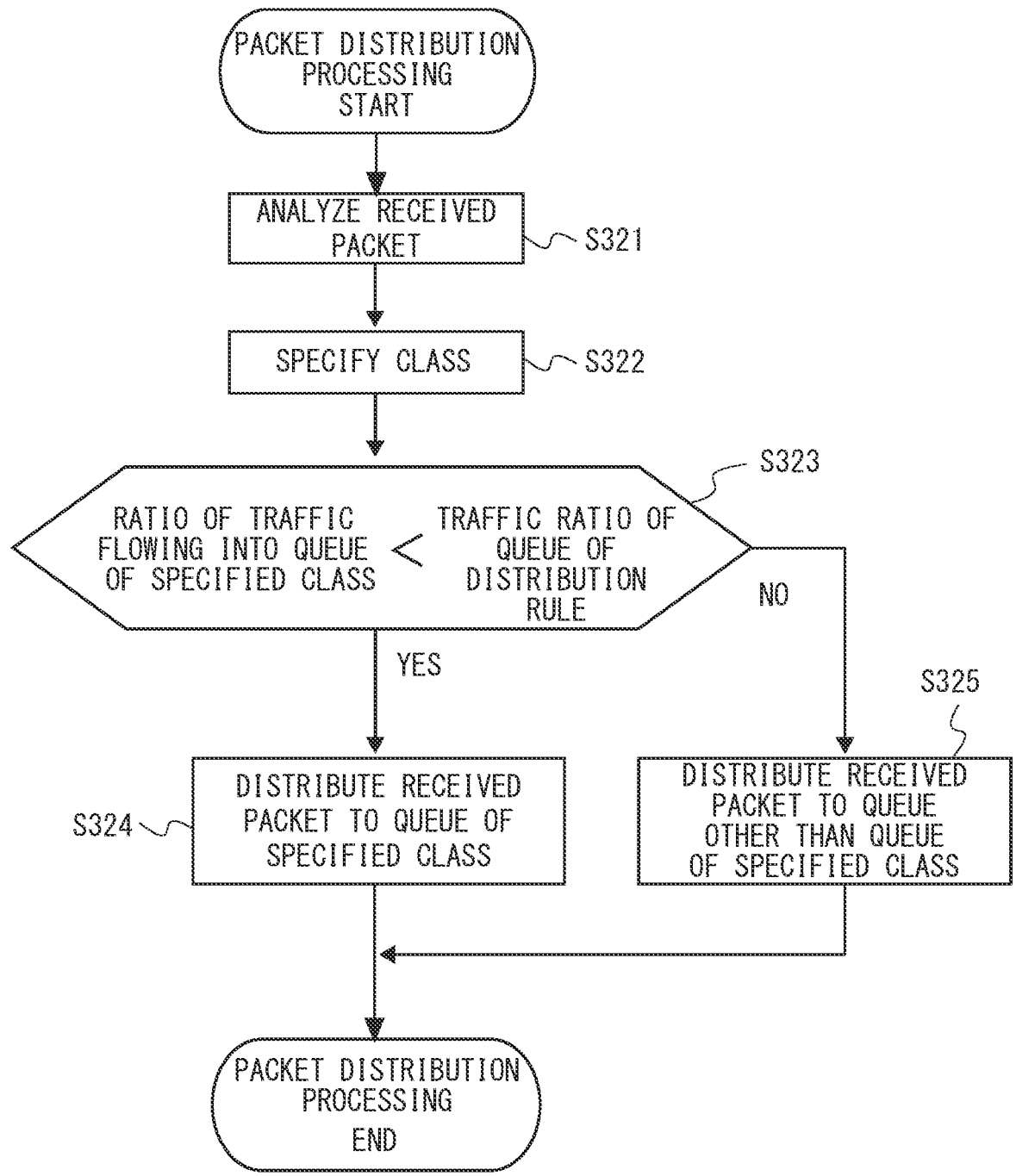
FIG. 8 is a flowchart showing a detailed flow of packet distribution processing according to the third example embodiment.

FIG. 8 is a flowchart showing a detailed flow of the packet distribution processing (S32) according to the third example embodiment. First, the packet distribution unit 33 analyzes the received packet (S321). At this time, the packet distribution unit 33 extracts an application type from a header of the received packet. Next, the packet distribution unit 33 specifies a class from the extracted application type (S322). For example, the packet distribution unit 33 refers to the class definition information 315 and specifies a class correlated with the extracted application type.

Subsequently, the packet distribution unit 33 determines whether a ratio of traffic flowing into the queue of the specified class is smaller than a traffic ratio (threshold value) of the queue of the distribution rule 314 (S323). For example, the packet distribution unit 33 acquires, from the class definition information 315, a ratio of the received packet correlated with the specified class number i. In addition, the packet distribution unit 33 obtains the amount of received packets actually distributed to the queue corresponding to the class number i while going back a predetermined period from the current time. In other words, the packet distribution unit 33 calculates a traffic flowing into the queue in the immediately preceding period, and calculates a ratio of traffics flowing into such a queue out of the total amount of packets received by the communication apparatus 3 in the predetermined period. Then, the packet distribution unit 33 compares the calculated inflow traffic ratio (A) with the acquired received packet ratio (B). When the ratio (A) is smaller than the ratio (B), the process proceeds to step S324, and when the ratio (A) is equal to or greater than the ratio (B), the process proceeds to step S325.

Here, when the ratio (A) is smaller than the ratio (B), the packet distribution unit 33 distributes the received packet to a queue (i) of the specified class (S324). When the ratio (A) is equal to or greater than the ratio (B), the packet distribution unit 33 distributes the received packet to a queue other than the queue of the specified class (S325). For example, the packet distribution unit 33 distributes the received packet to a queue of a class number i+1.

Figure 9:
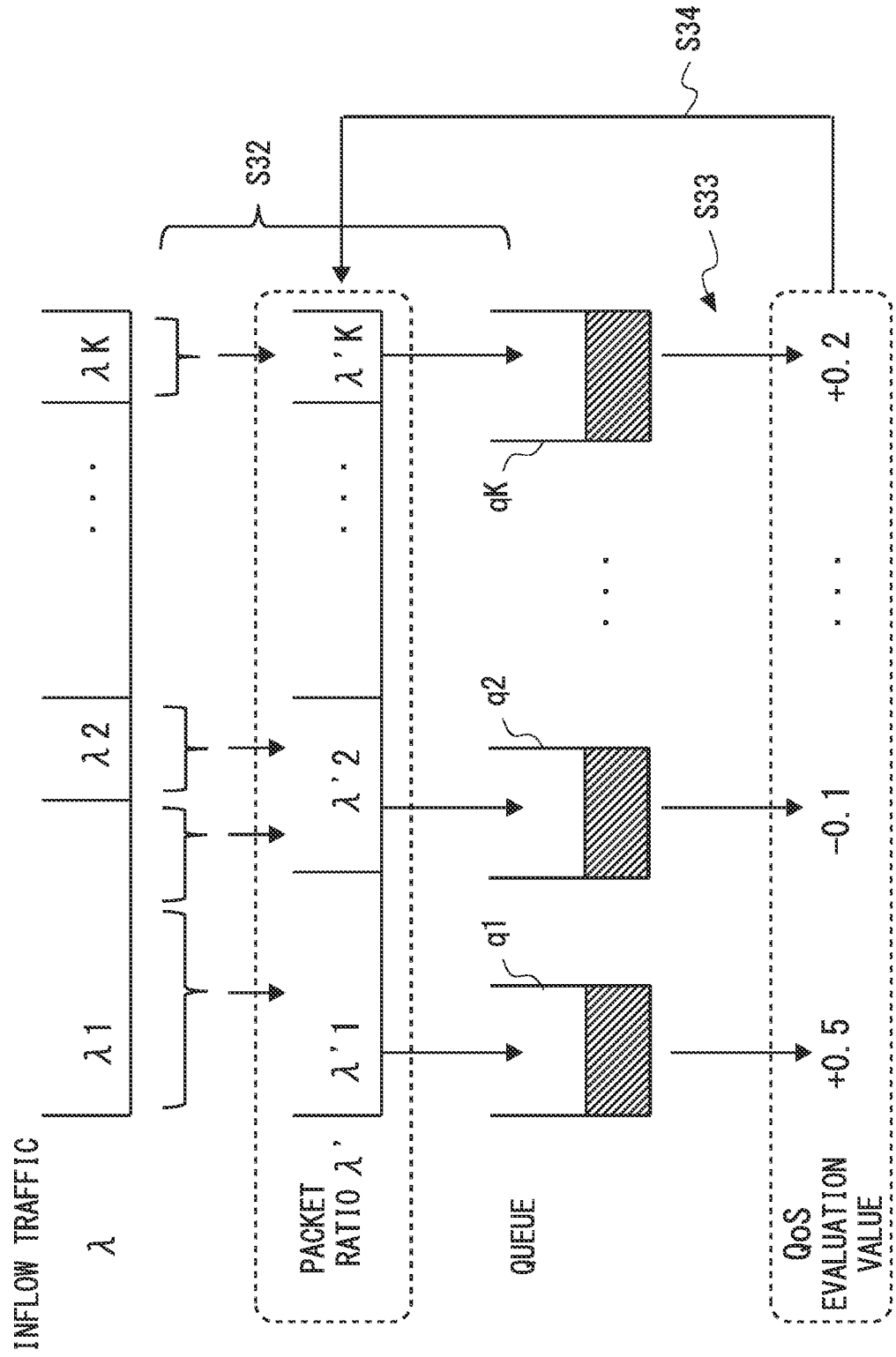
FIG. 9 is a diagram illustrating a concept of distribution to a queue of a received packet based on a distribution rule according to the third example embodiment.

FIG. 9 is a diagram illustrating a concept of distributing the received packet to the queue based on the distribution rule according to the third example embodiment. The inflow traffic $\lambda$ indicates a total amount of packets received by the communication apparatus 3 in a predetermined period. Symbols $\lambda1$, $\lambda2$, ( ... ), and $\lambda K$ represent respectively traffics for respective application types (1 to K, K being n or less) designated in the headers of the respective received packets included in the inflow traffic $\lambda$. In addition, queues q1 to qK are set with QoS indexes corresponding to the application types 1 to K, respectively. Therefore, it is assumed that the distribution rule before the update is defined such that all $\lambda1$ is distributed to the queue q1, all $\lambda2$ is distributed to the queue q2, ( ... ), and all $\lambda K$ is distributed to the queue qK.

Here, it is assumed that the traffic $\lambda1$ increases from an initial assumption value, that is, the traffic deviates toward the application type 1. Therefore, when the distribution rule is not updated, the inflow of traffic to the queue q1 may continue, the delay of the queue q1 may increase, and the loss may occur frequently. Accordingly, it becomes difficult to satisfy the QoS index of the queue q1.

Therefore, in the present example embodiment, a ratio of $\lambda1$ to the whole increases, and the traffic observation unit 32 distributes based on the distribution rule (S32). Among them, the evaluation value calculation unit 34 calculates QoS evaluation values of the queues q1 to qK, and calculates a total evaluation value (S33), and the update unit 35 updates the distribution rule 314 and the QoS evaluation equation so as to maximize the total evaluation value (S34). At this time, the update unit 35 reduces a ratio of $\lambda'1$ and increases a ratio of $\lambda'2$ so as to keep the ratio of $\lambda1$ within a certain range, and updates the distribution rule 314. Therefore, when the traffic observation unit 32 performs distribution using the updated distribution rule 314, the packet is distributed to the queue q1 in a case of being within the range of $\lambda'1$ of the $\lambda1$ (S324), but is distributed to the queue q2 in a case of exceeding $\lambda'1$ (S325).

As described above, according to the present example embodiment, even when the inflow traffic is concentrated in a certain traffic class, the overall QoS of the plurality of queues can be improved.

Fourth Example Embodiment

A fourth example embodiment is an improvement of the third example embodiment described above. In the third example embodiment described above, there is a room for further improving the overall QoS. Therefore, the fourth example embodiment shows a method of updating a control parameter p for QoS control in a queue so as to maximize an evaluation value using the QoS evaluation value described above.

Figure 10:
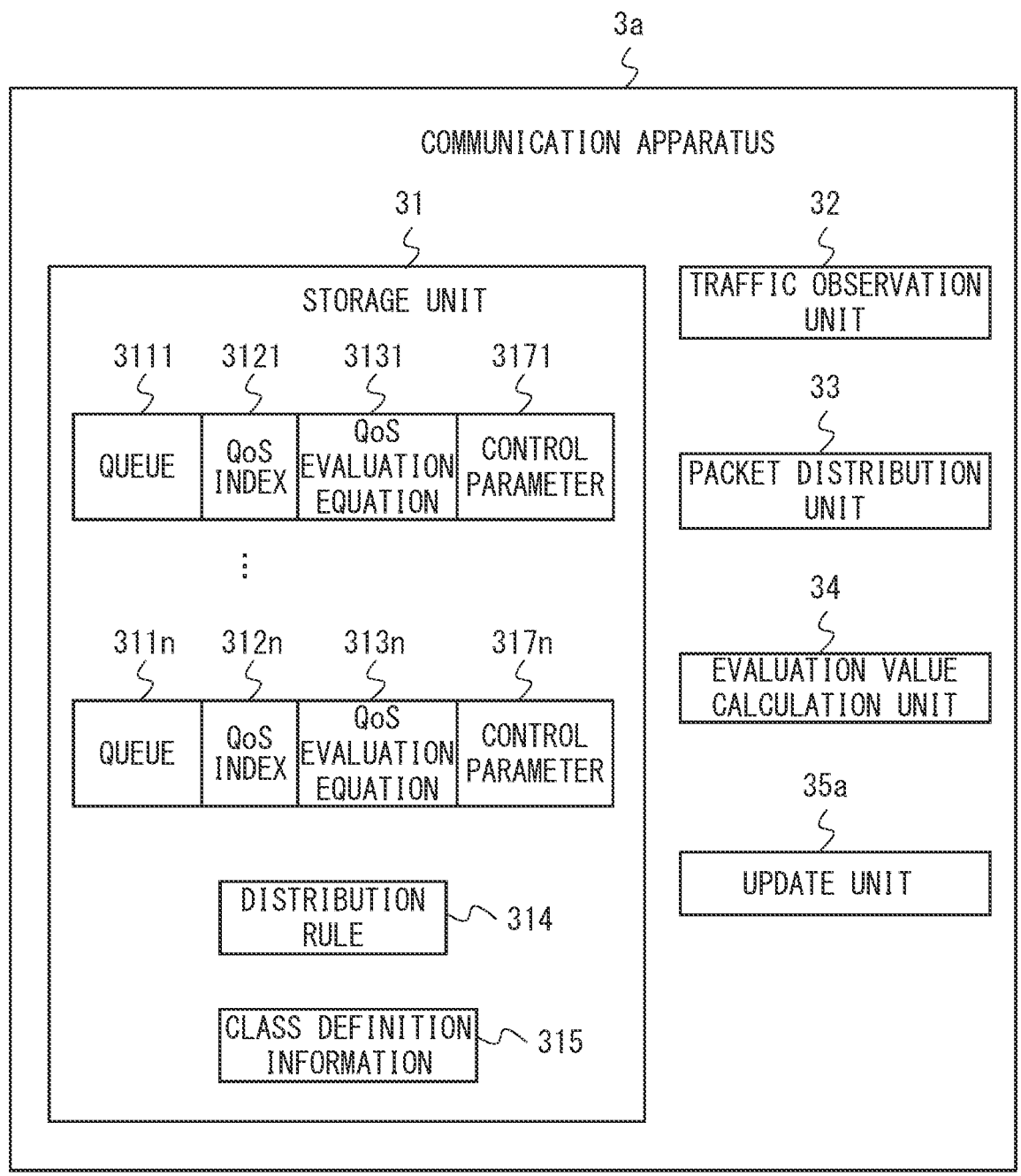
FIG. 10 is a block diagram showing a configuration of a communication apparatus according to a fourth example embodiment.

FIG. 10 is a block diagram showing a configuration of a communication apparatus 3a according to the fourth example embodiment. The communication apparatus 3a is configured in which control parameters 3171 to 317n are added to the storage unit 31 and the update unit 35 is replaced with an update unit 35a in the communication apparatus 3 described above. Other components are the same as those of the communication apparatus 3, and thus will not be described in detail.

Each of the control parameters 3171 to 317n is a parameter used for QoS control performed based on the QoS index set in each of the queues. Each of the control parameters 3171 to 317n is correlated with each of the queues 3111 to 311n. In other words, the queue 3111 is set with the QoS index 3121, the QoS evaluation equation 3131, and the control parameter 3171. Similarly, the queue 311n is set with the QoS index 312n, the QoS evaluation equation 313n, and the control parameter 317n. For example, each of the control parameters 3171 to 317n may be a parameter related to packet loss control.

The update unit 35a updates the control parameters 3171 to 317n set in the corresponding queues using the QoS evaluation value for each queue calculated by the evaluation value calculation unit 34. For example, the update unit 35a may use Equation (7) to be described below as an updating equation of the control parameter p.

[Equation 7]

$$p \leftarrow p + (r^i_t - \widehat{r^i_t})(p - \hat{p}) \tag{7}$$

Here, the symbol ^ represents an average. However, it is assumed that Equation (8) to be described below is satisfied.

[Equation 8]

$$\hat{p} = \gamma p - (1 - \gamma)\hat{p} \tag{8}$$

Here, the symbol γ represents a weight of the past update value. Further, it is assumed that the average ^ of $r^i_t$ is the same as in Equation (8).

In other words, due to increase and decrease of the QoS evaluation value, when the reward (in reinforcement learning and the like) increases, the control parameter is updated (increased and decreased) in a forward direction, and when the reward decreases (deteriorates), the control parameter is updated (increased and decreased) in an opposite direction.

In addition, the update unit 35a updates the control parameters according to the calculation of the QoS evaluation value, and preferably updates the distribution rule 314 and the QoS evaluation equations 3131 to 313n after the control parameters are optimized. Thereby, the QoS can be maximized more effectively compared with the third example embodiment.

Figure 11:
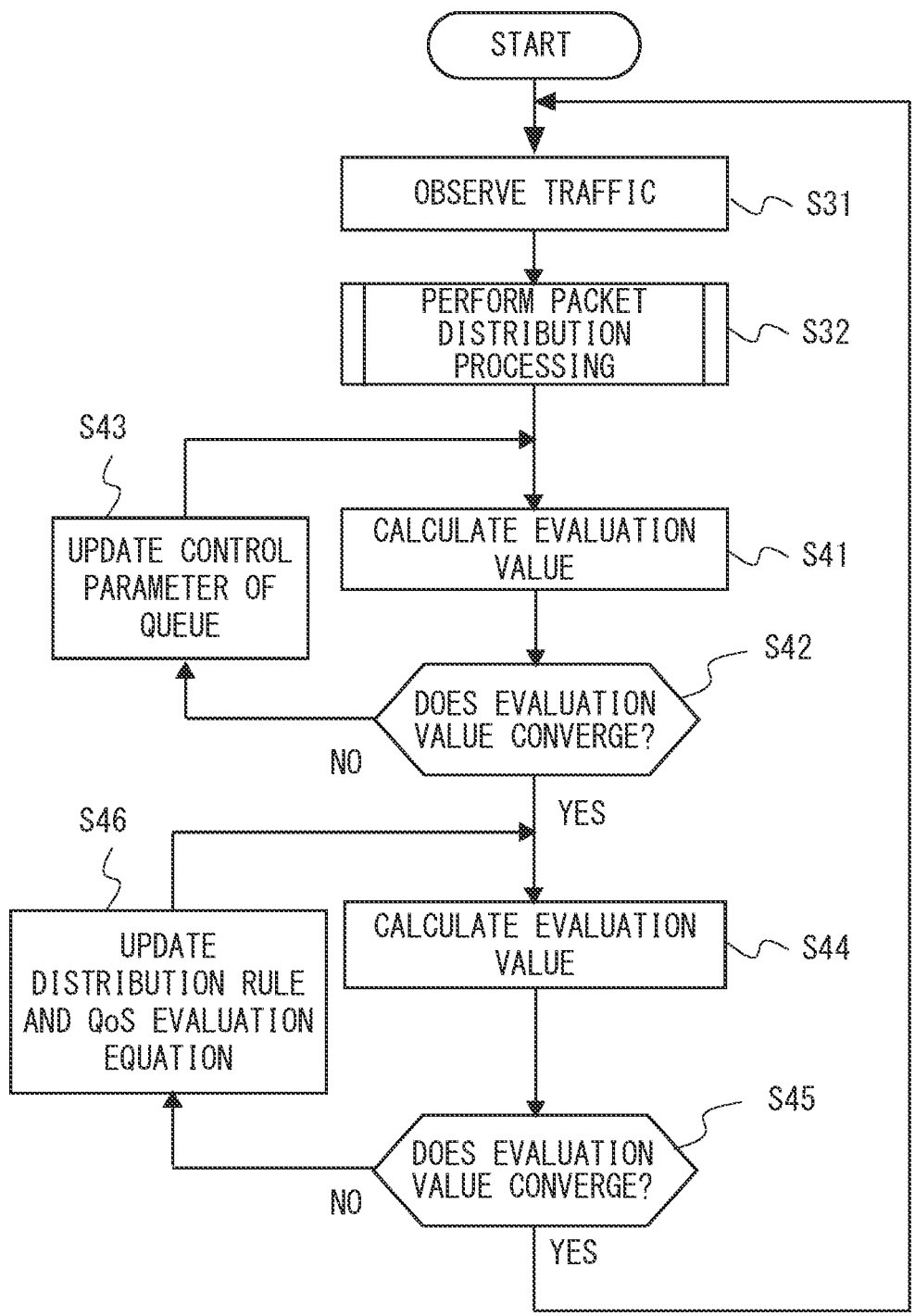
FIG. 11 is a flowchart showing a flow of a communication control method according to the fourth example embodiment.

FIG. 11 is a flowchart showing a flow of a communication control method according to the fourth example embodiment. First, the traffic observation unit 32 performs step S31 as in FIG. 7, and the packet distribution unit 33 performs step S32 as in FIG. 7. Next, the evaluation value calculation unit 34 calculates an evaluation value in the same manner as in step S33 of FIG. 7 (S41).

Here, the communication apparatus 3a determines whether the evaluation value converges (S42). Here, examples of convergence conditions of the evaluation value include that a threshold value of the number of loops has been exceeded and variation in the QoS evaluation value is equal to or less than a threshold value.

When it is determined in step S42 that the evaluation value does not converge, the update unit 35a updates the control parameter of the queue as described above (S43). Thereafter, steps S41 and S42 are performed again. When it is determined in step S42 that the evaluation value converges, the evaluation value calculation unit 34 calculates the evaluation value in the same manner as in step S33 of FIG. 7 (S44).

Then, the communication apparatus 3a determines whether the evaluation value converges (S45). When it is determined in step S45 that the evaluation value does not converge, the update unit 35a updates the distribution rule and the QoS evaluation equation in the same manner as in step S34 of FIG. 7 (S46). Thereafter, steps S44 and S45 are performed again. When it is determined in step S45 that the evaluation value converges, the process returns to step S31.

In the communication control method according to the fourth example embodiment, the evaluation value calculation and the evaluation value convergence may be determined for each distribution of the received packet. For example, the process returns to step S31 after step S43 in FIG. 11, and steps S31 and S32 are performed after step S42. Then, the process may proceed to step S44, and steps S31, S32, S44, and S45 may be performed again after step S46.

Figure 12:
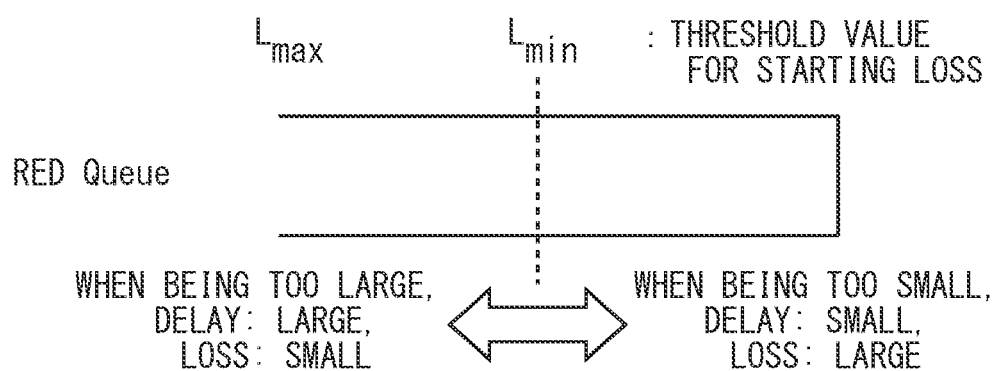
FIG. 12 is a diagram illustrating a concept of an update of queue setting according to the fourth example embodiment.

FIG. 12 is a diagram illustrating a concept of updating the queue setting according to the fourth example embodiment. Here, a description will be given with respect to a case where RED (Random Early Detection) is used as loss control of each queue. In the RED, examples of two threshold values of a length of the queue (queue length) to be used include a maximum value Lmax and a minimum value Lmin. Then, when the queue length exceeds the Lmin, packet loss (discard) is stochastically started. In addition, when the queue length exceeds the Lmax, a Tail drop (discarding the last queue) is performed. Therefore, a loss rate between the Lmin and the Lmax of the queue length increases linearly.

In the fourth example embodiment, for example, the control parameter is the Lmin (threshold value for starting the loss). Then, the update unit 35a updates the Lmin in a maximizing direction of the QoS evaluation value. Here, when the Lmin is too large, the delay is large and the loss is small, whereas when the Lmin is too small, the delay is small and the loss is large. The other parameter Lmax can also be updated by updating Equation (7) in the same manner.

According to the fourth example embodiment as described above, the updating of the control parameter is added to a preceding state of the communication control method in the third example embodiment, and the loop is performed according to the degree of convergence of the QoS evaluation value. According to the fourth example embodiment, the overall QoS can be further improved compared with the third example embodiment.

Other Example Embodiments

The third or fourth example embodiment described above may be applied to the communication control system of the second example embodiment.

In the example embodiments described above, the description is made as a hardware configuration, but the present invention is not limited thereto. The present disclosure can also be realized by a computer program for causing a CPU to execute any processing.

In the example described above, a program can be stored and provided to a computer using various types of non-transitory computer readable media. Non-transitory computer readable media include various types of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, DVD (Digital Versatile Disc), and semiconductor memories (such as mask ROM, PROM (Programmable ROM), EPROM (Erasable PROM), flash ROM, RAM (Random Access Memory), etc.). The program may be provided to a computer using various types of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The present disclosure is not limited to the above example embodiments, and can be appropriately modified without departing from the gist. In addition, the present disclosure may be carried out by an appropriate combination of the respective example embodiments.

Some or all of the above example embodiments may also be described as following Supplementary notes, but are not limited thereto.

(Supplementary Note A1)

A communication apparatus including:
- a distribution unit configured to distribute, based on a distribution rule for satisfying a plurality of different QoS (Quality of Service) indexes set in a plurality of queues, respectively, a received packet to any one of the plurality of queues; and
- an update unit configured to update the distribution rule based on performance information of each of the plurality of queues, the performance information being calculated for the QoS index set in each of the queues.

(Supplementary Note A2)

The communication apparatus according to Supplementary note A1, wherein the plurality of queues have a plurality of different QoS evaluation equations set according to the set QoS indexes, respectively, and the communication apparatus further includes a calculation unit for calculating a QoS evaluation value in each of the queues as the performance information, using the QoS evaluation equation set in each of the queues.

(Supplementary Note A3)

The communication apparatus according to Supplementary note A2, wherein the update unit further updates the QoS evaluation equation based on the performance information.

(Supplementary Note A4)

The communication apparatus according to Supplementary note A2, wherein each of the plurality of QoS evaluation equations is a calculation equation for calculating a degree of improvement from the performance information of an immediately preceding section in the corresponding queue, as the QoS evaluation value.

(Supplementary Note A5)

The communication apparatus according to Supplementary note A4, wherein the update unit further updates the QoS evaluation equation by reflecting a ratio of the QoS index designated in the received packet received in a predetermined period on weighting of the degree of improvement.

(Supplementary Note A6)

The communication apparatus according to any one of Supplementary notes A2 to A5, wherein the calculation unit calculates a total evaluation value of all of the queues based on the plurality of QoS evaluation values which are calculated for the plurality of queues, respectively, and the update unit updates the distribution rule to maximize the total evaluation value.

(Supplementary Note A7)

The communication apparatus according to any one of Supplementary notes A2 to A6, wherein the update unit updates, using the QoS evaluation value, a control parameter used for QoS control performed based on the QoS index set in each of the queues.

(Supplementary Note A8)

The communication apparatus according to Supplementary note A7, wherein the control parameter is a parameter related to packet loss control.

(Supplementary Note A9)

The communication apparatus according to Supplementary note A7 or A8, wherein the update unit updates the control parameter according to calculation of the QoS evaluation value, and updates the distribution rule and the QoS evaluation equation after the control parameter is optimized.

(Supplementary Note A10)

The communication apparatus according to any one of Supplementary notes A1 to A9, wherein
- the distribution rule is information indicating a ratio of the received packet to be distributed to each of the queues,
- the distribution unit being configured to:
- specify a queue corresponding to the QoS index, which is designated in the received packet, from the plurality of queues, and
- distribute the received packet to another queue among the plurality of queues when a ratio of the amount of the received packets in the specified queue for a predetermined period exceeds a ratio of the received packets in the queue shown in the distribution rule.

(Supplementary Note B1)

A communication control system including:
- a communication apparatus including a plurality of queues in which a plurality of different QoS (Quality of Service) indexes are set; and
- an information processing apparatus connected to the communication apparatus,
- the communication apparatus being configured to distribute, based on a distribution rule for satisfying the plurality of QoS indexes, a received packet to any one of the plurality of queues, and to transmit performance information of each of the plurality of queues to the information processing apparatus, the performance information being calculated for the QoS index set in each of the plurality of queues,
- the information processing apparatus being configured to update the distribution rule based on the performance information received from the communication apparatus, and to set the updated distribution rule in the communication apparatus.

(Supplementary Note B2)

The communication control system according to Supplementary note B1, wherein
- the plurality of queues have a plurality of different QoS evaluation equations set according to the set QoS indexes, respectively, and
- the communication apparatus is configured to calculate a QoS evaluation value in each of the queues as the performance information, using the QoS evaluation equation set in each of the queues.

(Supplementary Note C1)

A communication control method including:
- distributing, based on a distribution rule for satisfying a plurality of different QoS (Quality of Service) indexes set in a plurality of queues, respectively, a received packet to any one of the plurality of queues; and
- updating the distribution rule based on performance information of each of the plurality of queues, the performance information being calculated for the QoS index set in each of the queues.

(Supplementary Note D1)

A communication control program for causing a computer to execute:

a process of distributing, based on a distribution rule for satisfying a plurality of different QoS (Quality of Service) indexes set in a plurality of queues, respectively, a received packet to any one of the plurality of queues; and a process of updating the distribution rule based on performance information of each of the plurality of queues, the performance information being calculated for the QoS index set in each of the queues.

Although the invention of the present application has been described above with reference to the example embodiments (and examples), the invention of the present application is not limited to the example embodiments (and examples). Various changes that can be understood by those skilled in the art can be made within the scope of the invention of the present application in the configuration and details of the invention of the present application.

Although the invention of the present application has been described above with reference to the example embodiments, the invention of the present application is not limited to the example embodiments. Various changes that can be understood by those skilled in the art can be made within the scope of the invention in the configuration and details of the invention of the present application.

This application is based upon and claims the benefit of priority from Japanese Patent Application No. 2019-017828, filed on Feb. 4, 2019, the entire contents of which are incorporated herein by reference.

REFERENCE SIGNS LIST 1 communication apparatus
111 queue
11n queue
12 distribution unit
13 update unit
2 communication control system
21 communication apparatus
211 queue
21n queue
22 information processing apparatus
3 communication apparatus
3a communication apparatus
31 storage unit
3111 queue
311n queue
3111a queue ID
311na queue ID
3121 QoS index
312n QoS index
3131 QoS evaluation equation
313n QoS evaluation equation
314 distribution rule
315 class definition information
316 communication control program
3171 control parameter
317n control parameter
32 traffic observation unit
33 packet distribution unit
34 evaluation value calculation unit
35 update unit
35a update unit
301 CPU
302 memory
303 communication unit
304 storage apparatus

The invention claimed is:

1. A non-transitory computer-readable medium storing a communication control program for causing a computer to execute:

a process of distributing, based on a distribution rule for satisfying a plurality of different QoS (Quality of Service) indexes set in a plurality of queues, respectively, a received packet to any one of the plurality of queues; and a process of updating the distribution rule based on performance information of each of the plurality of queues and a total evaluation value of all of the queues, the performance information being calculated for the QoS index set in each of the queues and the total evaluation value being calculated based on the performance information of each of the plurality of queues, wherein the plurality of queues have a plurality of different QoS evaluation equations set according to the set QoS indexes, respectively, and wherein the at least one processor further configured to execute the instructions to:

calculate a QoS evaluation value in each of the queues as the performance information, using the QoS evaluation equation set in each of the queues;

calculate the total evaluation value of all of the queues based on the plurality of QoS evaluation values which are calculated for the plurality of queues, respectively; and update the distribution rule to maximize the total evaluation value.

2. A communication apparatus comprising:

at least one memory configured to store instructions; and at least one processor configured to execute the instructions to:

distribute, based on a distribution rule for satisfying a plurality of different QoS (Quality of Service) indexes set in a plurality of queues, respectively, a received packet to any one of the plurality of queues; and update the distribution rule based on performance information of each of the plurality of queues and a total evaluation value of all of the queues, the performance information being calculated for the QoS index set in each of the queues and the total evaluation value being calculated based on the performance information of each of the plurality of queues, wherein the plurality of queues have a plurality of different QoS evaluation equations set according to the set QoS indexes, respectively, and wherein the at least one processor further configured to execute the instructions to:

calculate a QoS evaluation value in each of the queues as the performance information, using the QoS evaluation equation set in each of the queues;

calculate the total evaluation value of all of the queues based on the plurality of QoS evaluation values which are calculated for the plurality of queues, respectively; and update the distribution rule to maximize the total evaluation value.

3. The communication apparatus according to claim 1, wherein each of the plurality of QoS evaluation equations is a calculation equation for calculating a degree of improvement from the performance information of an immediately preceding section in the corresponding queue, as the QoS evaluation value.

4. The communication apparatus according to claim 3, wherein the at least one processor further configured to execute the instructions to update the QoS evaluation equation by reflecting a ratio of the QoS index designated in the received packet received in a predetermined period on weighting of the degree of improvement.

5. The communication apparatus according to claim 1, wherein the at least one processor further configured to execute the instructions to update, using the QoS evaluation value, a control parameter used for QoS control performed based on the QoS index set in each of the queues.

6. The communication apparatus according to claim 5, wherein the at least one processor further configured to execute the instructions to update the control parameter according to calculation of the QoS evaluation value, and update the distribution rule and the QoS evaluation equation after the control parameter is optimized.

7. The communication apparatus according to claim 6, wherein the control parameter is a parameter related to packet loss control.

8. The communication apparatus according to claim 1, wherein the at least one processor further configured to execute the instructions to update the QoS evaluation equation based on the performance information.

9. The communication apparatus according to claim 2, wherein
the distribution rule is information indicating a ratio of the received packet to be distributed to each of the queues, and
wherein the at least one processor further configured to execute the instructions to specify a queue corresponding to the QoS index, which is designated in the received packets, from the plurality of queues, and
distribute the received packets to another queue among the plurality of queues when a ratio of the amount of the received packets in the specified queue for a predetermined period exceeds a ratio of the received packets in the queue shown in the distribution rule.

10. A communication control method using a computer, the method comprising:
distributing, based on a distribution rule for satisfying a plurality of different QoS (Quality of Service) indexes set in a plurality of queues, respectively, a received packet to any one of the plurality of queues; and
updating the distribution rule based on performance information of each of the plurality of queues and a total evaluation value of all of the queues, the performance information being calculated for the QoS index set in each of the queues and the total evaluation value being calculated based on the performance information of each of the plurality of queues,
wherein the plurality of queues have a plurality of different QoS evaluation equations set according to the set QoS indexes, respectively, and
wherein the at least one processor further configured to execute the instructions to:
calculate a QoS evaluation value in each of the queues as the performance information, using the QoS evaluation equation set in each of the queues;
calculate the total evaluation value of all of the queues based on the plurality of QoS evaluation values which are calculated for the plurality of queues, respectively; and
update the distribution rule to maximize the total evaluation value.

\* \* \* \* \*